US010144319B2

(12) United States Patent
Stevens-Poire'

(10) Patent No.: US 10,144,319 B2
(45) Date of Patent: Dec. 4, 2018

(54) CARRIER WITH SHOCK ABSORBING MATERIAL

(71) Applicant: Dianne Tomita Stevens-Poire', Kaneohe, HI (US)

(72) Inventor: Dianne Tomita Stevens-Poire', Kaneohe, HI (US)

( * ) Notice: Subject to any disclaimer, the term of this patent is extended or adjusted under 35 U.S.C. 154(b) by 311 days.

(21) Appl. No.: 14/844,237

(22) Filed: Sep. 3, 2015

(65) Prior Publication Data

US 2016/0068088 A1    Mar. 10, 2016

Related U.S. Application Data

(60) Provisional application No. 62/045,667, filed on Sep. 4, 2014.

(51) Int. Cl.
*B60N 2/58* (2006.01)
*B60N 2/70* (2006.01)
*B60N 2/28* (2006.01)

(52) U.S. Cl.
CPC .............. *B60N 2/58* (2013.01); *B60N 2/2881* (2013.01); *B60N 2/7035* (2013.01)

(58) Field of Classification Search
CPC ...................................... B60N 2/60; B62J 1/22
See application file for complete search history.

(56) References Cited

U.S. PATENT DOCUMENTS

| 3,000,020 A | * | 9/1961 | Lombard | A47C 7/20 |
| | | | | 244/122 R |
| 4,031,579 A | * | 6/1977 | Larned | A47C 7/746 |
| | | | | 297/219.11 |
| 4,251,991 A | * | 2/1981 | Wood | F03B 13/20 |
| | | | | 219/216 |
| 4,944,554 A | | 7/1990 | Gross et al. | |
| 5,403,066 A | * | 4/1995 | Drum | B60N 2/6054 |
| | | | | 297/219.1 |
| 5,833,320 A | | 11/1998 | Kaneko et al. | |
| 6,230,501 B1 | | 5/2001 | Bailey, Sr. et al. | |
| 6,332,651 B1 | * | 12/2001 | Horisawa | A47C 7/742 |
| | | | | 297/219.1 |
| 6,676,209 B1 | * | 1/2004 | Szabo | B60N 2/60 |
| | | | | 297/188.01 |
| 7,686,392 B2 | * | 3/2010 | Kenny | B60N 2/6018 |
| | | | | 297/188.06 |
| 7,717,520 B2 | * | 5/2010 | Boren | B64D 11/06 |
| | | | | 297/216.1 |
| 7,931,335 B1 | * | 4/2011 | Siklosi | B60N 2/6027 |
| | | | | 297/219.1 |

(Continued)

*Primary Examiner* — Sarah B McPartlin

(57) ABSTRACT

The disclosed invention will prevent or lessen injury to passengers when used as a supplemental safety device designed to work in combination with existing safety features found in transport vehicles. Family vans or SUVs have seats that are closest to the bumper that use a separate chassis with no crunch/crumble zones, offering minimal or no protection during rear-end collisions. In 2012 Ford Motor analysis stated, when a minivan with a third-row occupant is hit from behind, the occupant is usually a child, is killed at least half of the time. The disclosed invention will decrease harmful or deadly forces which drive the occupants backwards during rear-end collisions and will change this tragic outcome if the force is diminished by 70%, it may save lives.

1 Claim, 7 Drawing Sheets

(56) References Cited

U.S. PATENT DOCUMENTS

| | | | |
|---|---|---|---|
| 8,104,840 B2 * | 1/2012 | Tarumi | A47C 7/021 |
| | | | 297/219.1 |
| 8,870,283 B2 * | 10/2014 | Daley | B60N 2/5816 |
| | | | 297/219.1 |
| 8,991,935 B2 | 3/2015 | Balensiefer, II et al. | |

\* cited by examiner

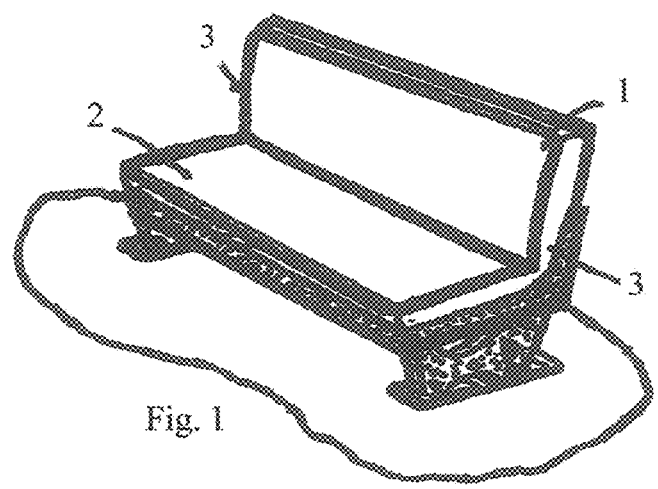
Fig. 1
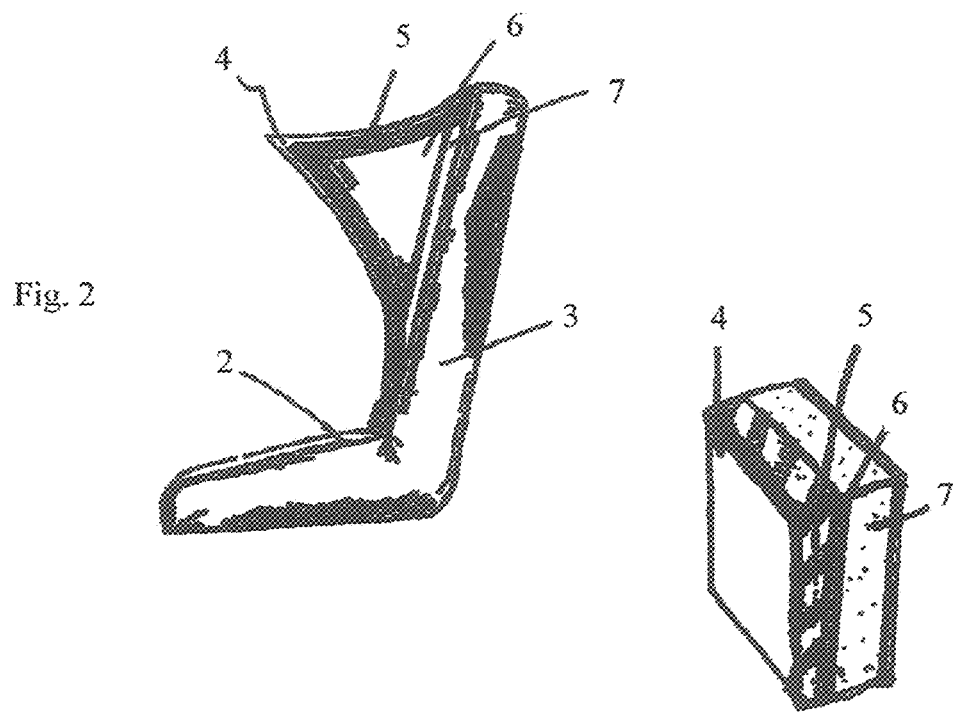
Fig. 2
Fig. 3

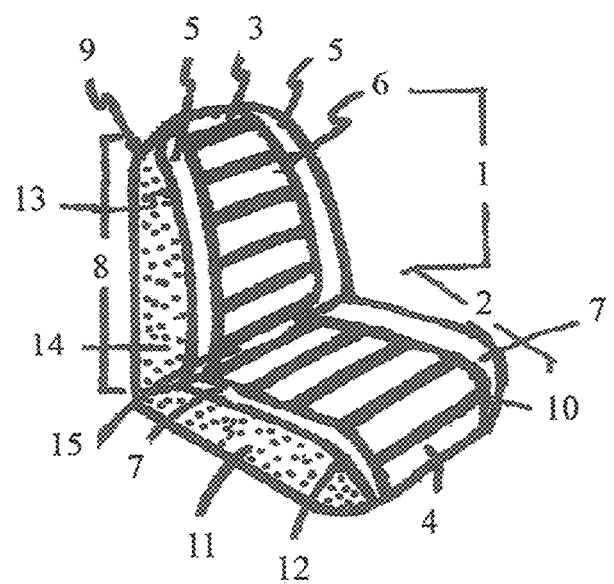
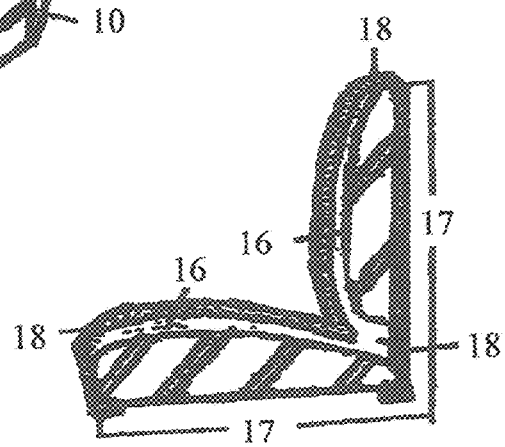
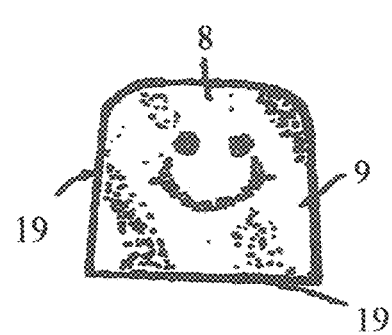
Fig. 4
Fig. 5
Fig. 6

1

CARRIER WITH SHOCK ABSORBING MATERIAL

BRIEF DESCRIPTION OF THE SEVERAL VIEWS OF THE DRAWING(S)

FIG. 1—a front perspective rendering of a bench seat folded open;

FIG. 2—a cross section perspective of the bench seat showing the visco elastic layer;

FIG. 3—is a cross sectional view of a cut-out piece of the seat.

FIG. 4 is a front right perspective embodiment view of the disclosed invention as a covering for a vehicle seat;

FIG. 5 is a left side cross sectional view of the seat shown in FIG. 4;

Figure 7:
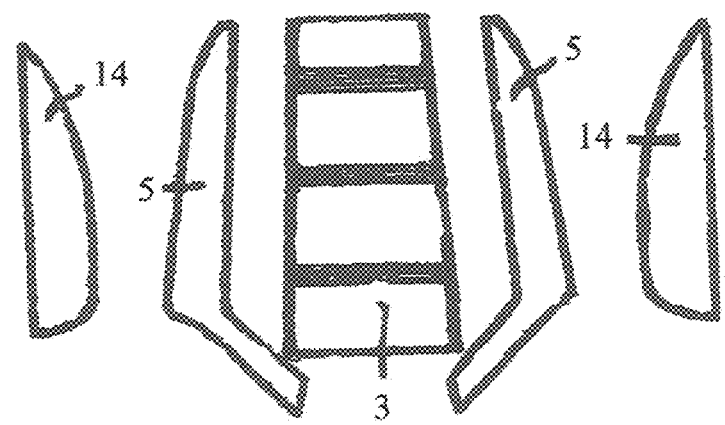
Figure 8:
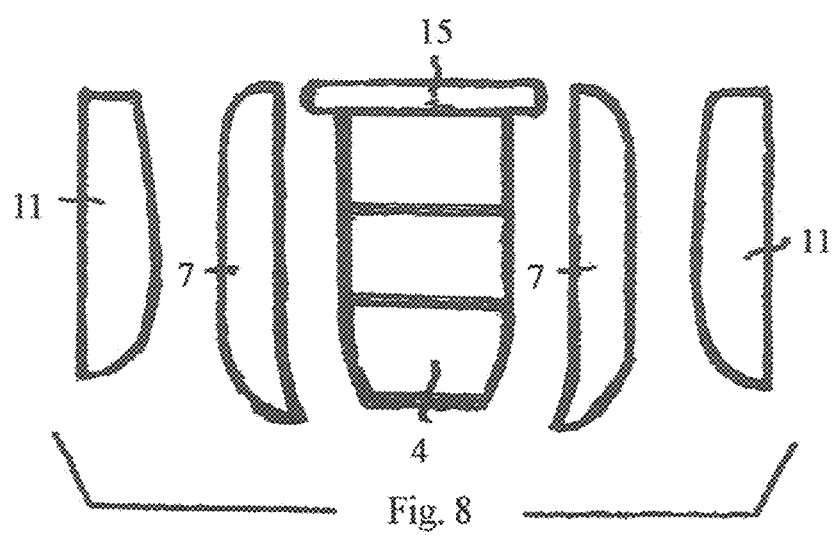

FIG. 6 is a view of the back cover section; FIG. 7 is an upper front exploded perspective view of the seat/carrier cover section; FIG. 8 is a lower front exploded perspective view of the seat/carrier cover section.

FIG. 7 is an upper front exploded perspective view of the seat/carrier cover section;

FIG. 8 is a lower front exploded perspective view of the seat/carrier cover section.

Figure 10:
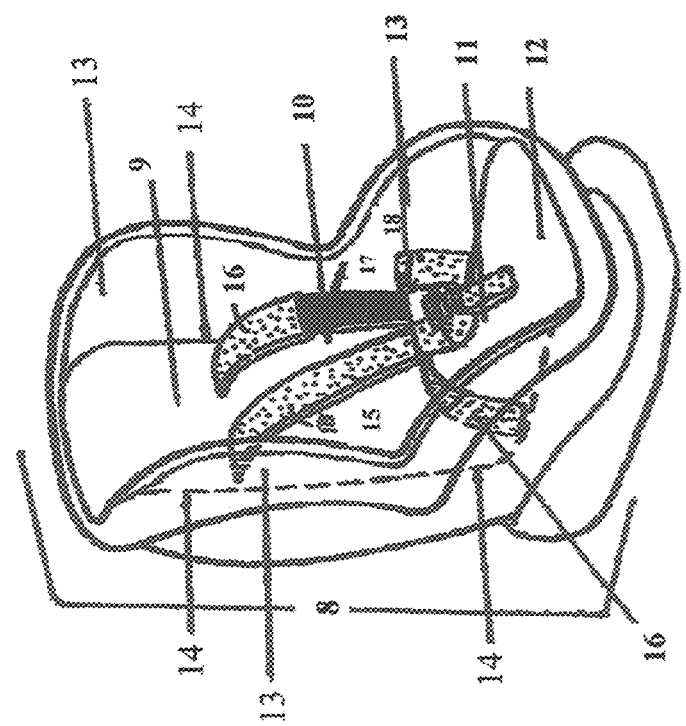
Figure 9:
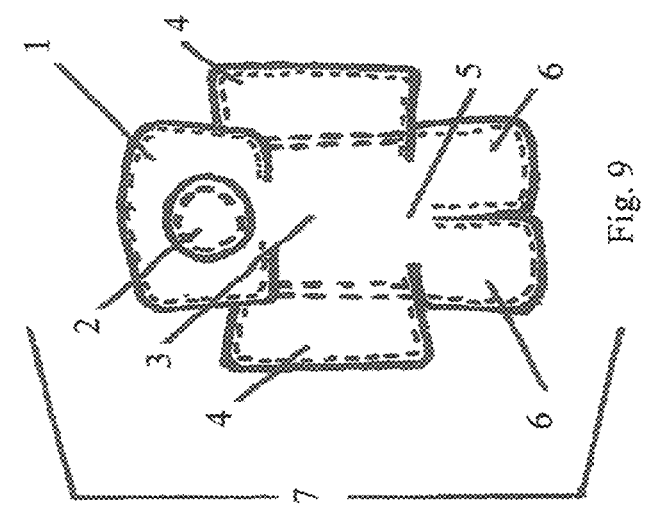

FIG. 9—a front perspective rendering of a mat or pad in a flat open position;

FIG. 10—is a right cross section perspective of the bench seat showing the visco elastic layer.

Figure 11:
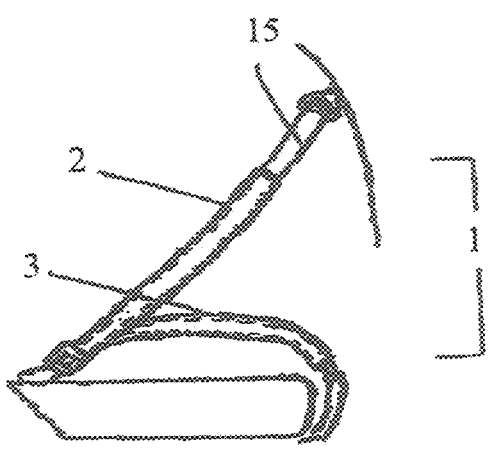
Figure 12:
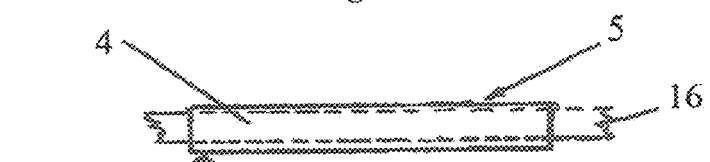
Figure 13:
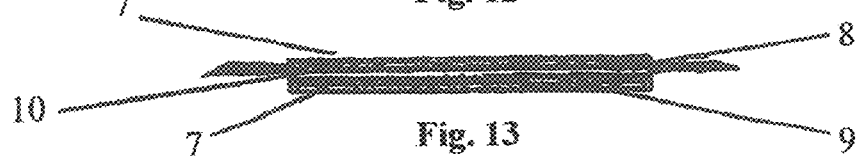
Figure 14:
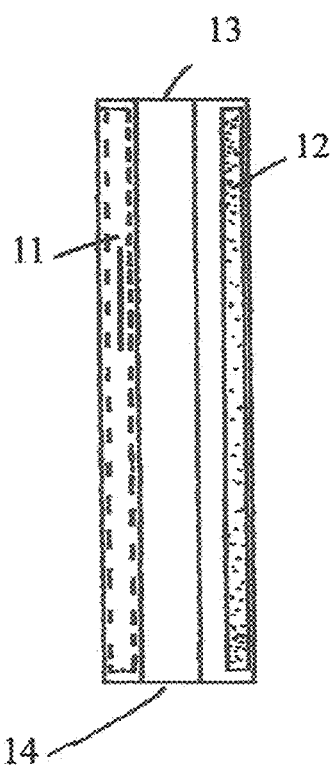

FIG. 11 is a perspective view of a preferred embodiment of the disclosed invention as a safety harness addition covering the shoulder strap and lap belt;

FIG. 12 is a perspective view of the disclosed invention of FIG. 11, illustrating a covering over a strap or belt member;

FIG. 13 is a cross sectional perspective side view of the preferred embodiment of the present shock absorbing seatbelt cover wrapped around a safety belt;

FIG. 14 is a flat detailed perspective view of the preferred embodiment of the present shock absorbing seatbelt cover.

Figure 15:
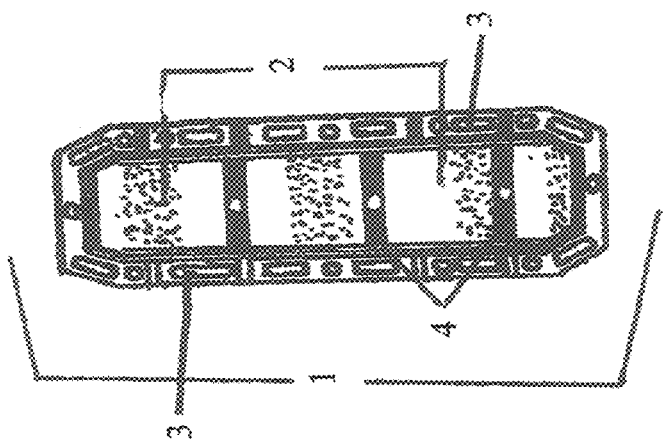

FIG. 15—a top perspective rendering of a mat or pad in a flat open position installed in a plastic basket stretcher.

Figure 16:
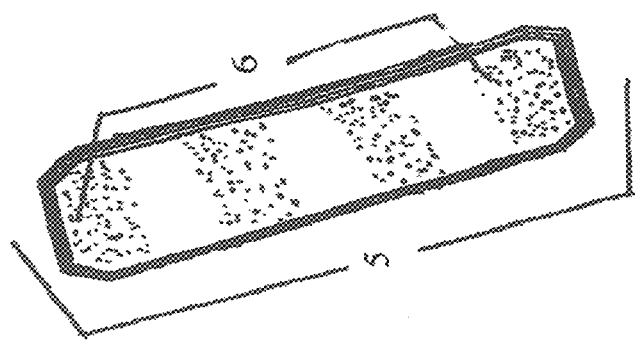

FIG. 16—a top perspective rendering of a mat or pad in a flat open position not installed showing the visco elastic layer.

EMBODIMENT 1

Carrier and Shock Absorber

The following is a preferred embodiment form of the disclosed invention based on the disclosed images, which are described in detail.

DETAILED DESCRIPTION OF EMBODIMENT 1

For this illustration a single upright, open seating surface is presented, though the upper backrest can be folded forward independently.

A vehicle bench seat, for instance the bench seat in FIG. 1, is provided with an upper backrest 1, a seat part 2 and having two side pieces 3, a left side piece (shown) and a right side piece (not seen). The rear bench is one single seating surface but can be divided into several seating surfaces which the disclosed invention can easily be incorporated.

When the seat part area is in the open position in FIG. 1, the disclosed invention cannot be seen or detected and has an undisturbed optical impression it looks like a normal vehicle bench seat.

FIG. 2 is a side view of a seat with the disclosed invention being illustrated with the upper protective upholstery layer 4, the disclosed invention as a layer of visco elastic polymer 5 affixed to the upholstery surface, the underside 6 of the disclosed invention which is secured to the vehicle seat padding 7 found inside the seats, the side piece of the seat 3 and the lower front seat portion 2. The lower seat portion 2 has an identical placement of the visco elastic polymer for the disclosed invention as the upper backrest portion of the seat in FIG. 1.

FIG. 3 is a side view perspective of a cut out portion of the seat having the disclosed invention imbedded into its format. The disclosed invention is illustrated with the upper protective upholstery layer 4, the layer of visco elastic polymer 5, the underside 6 of the disclosed invention which is secured to the vehicle seat padding 7 found inside the seats acting as a comfortable seat. The seating comfort is not influenced in any negative way nor does it detract from any level of comfort in any way.

The appearance and upholstered area of any section of the seat part will not be affected by the disclosed invention, which is attached directly to the upholstery and padding of the vehicle seat. The disclosed invention, when used or displayed in this manner, is not visible and when the seat having the disclosed invention is open or folded down with the backrest part resting on the seat part area of the bench, it does not attract attention to any visible changes in the seat part area when in use.

EMBODIMENT 2

Carrier Cover

Referring to the drawings in FIGS. 4-8 is illustrative but not limited to the type of seat for which the disclosed invention in the embodiment as a cover is presented. For this illustration a single upright, open seating surface is presented though the upper backrest portion of the seat can be folded forward independently.

A preferred embodiment of the disclosed invention as a carrier cover will be further described based on the subordinate claims, other objects and advantages will be named or will become apparent from, the specifications and claims, as will modifications of the named embodiment shown in the drawings.

DETAILED DESCRIPTION OF EMBODIMENT 2

The disclosed invention in the embodiment as a seat covering 01 is shown encasing a vehicle seat in FIG. 4 having a front upper backrest 1 a front lower seat 2 and a back member 8 which are attached or joined 9 to the side panels. The front upper backrest member 1 is comprised of a narrow right side strip 5 which is connected 6 to the middle portion 3 is connected securely 6 to a narrow left side strip 5. The right 5 middle 3 and left 5 are joined together at 6 to form the surface of the front upper backrest which then is joined to the right side piece by a seam 13 to a left side piece 14 and a right side piece 14 to form the upper front backrest 1 in its entirety as depicted in FIG. 4.

FIG. 4 has a front lower seat portion 2 and a back member 8 which are attached. The front lower seat member 2 is comprised of a narrow right side strip 7, a middle portion 4 securely connected at 10 and a narrow left side strip also connected at 10 to the middle portion 4. The right 7, middle 3 4 and left 7 front seat portions are all securely fastened together 10 respectively and join together to form the sitting surface of front lower seat portion 2 of the disclosed embodiment as a cover. This front lower seat portion is joined 12 to a side lower seat piece 11. The upper front upper backrest 1 is connected 15 to the front lower seat portion 2 and then affixed 9 to the back member 8. This is securely attached to form a compartment case or pocket which slides over the top of the vehicle seat to ensure a secure, attractive fit.

FIG. 5 is a cross sectional view depicting the middle portion of the disclosed invention in the embodiment as a cover fitted on a carrier depicted here as a vehicle bucket seat with the top layer of fabric material 18 attached to the visco elastic polymer 16 with the disclosed invention then being placed directly on the seat 17. This cross sectional view shows the middle portion of the carrier as a vehicle bucket seat 17 having the visco elastic polymer material 16 depicted resting securely upon the vehicle seat 17 affixed to the layer of durable material 18 on the front backrest side 18 and the front seat side of the carrier covering the seat.

The cross section depicted in FIG. 5 attached is shown here with the durable layer of material 18 above the visco elastic polymer material 16. The upper and lower front backrest 1 and 2 are illustrated together with a cross sectional view of the seat 3 and 4 individually with the viscoelastic polymer placed or attached directly beneath the upper durable material illustrating how the visco elastic polymer material will protect the neck, spine, hips and knees of the seated passenger (or cargo) from a rear end collision when placed or seated upon the disclosed invention to absorb and diminish the shock force by being aligned perfectly with the person sitting on the carrier cover.

FIG. 6 the upper back portion of the cover, shown here in a rear facing perspective placed on the seat is depicting the carrier cover on the back of a vehicle bucket seat. The back of the carrier cover 8 is made of durable upholstery fabric that is presently found in vehicles and is attached by a seam 9 to the upper side pieces 14 to form the entire upper portion of the front backrest 1 depicted in FIG. 4. The upper front backrest 1 portion of the carrier cover attaches to a left 14 and right side piece 14 to form the upper top portion of the cover compartment which then slides over the top and bottom of the existing vehicle seat ensuring a secure fit by tightly folding under 19 gripping the bottom rear of the vehicle seat 17.

FIG. 7 is an exploded view of the upper front backrest perspective view of the disclosed invention in the embodiment as a cover. The front upper backrest member is comprised of a 4 narrow right side strip 5 a middle 3 and left 5 join together to form the surface of the front upper backrest which then 5 is joined to the right side piece 14 and to a left side piece 14 to form the upper front backrest in its entirety 1 as depicted in FIG. 4.

FIG. 8 is a lower front seat in an exploded perspective view of an embodiment of a cover. The front lower seat member 2 as depicted in FIG. 4. is comprised of a narrow right side strip 7 a middle 4 and left 7 forming the front seat portions which are all securely fastened together respectively and join together to form the sitting surface of front lower seat portion 2 shown in FIG. 4. of the disclosed embodiment as a carrier cover. This is then attached to the lower right and left seat side pieces 11 which attach to the back cover that is shown in FIG. 6.

EMBODIMENT 3

Carrier for Safety Seating Child safety seats presently found on the market do not possess shock absorbing qualities to protect the infant or child from the linear horizontal force plane shock energy generated by a rear-end collision, a roll-over accident or other such unexpected tragedy, only the disclosed invention does offer shock absorbing protection at the present time.

DETAILED DESCRIPTION OF EMBODIMENT 3

FIG. 9 illustrates a preferred embodiment of the disclosed invention in the form of a shock absorbing pad or a protective liner for an infant, toddler or child's safety seat or adaptable 3-in-1 chameleon seats which serve multi-use functions using the carrier portion to interlock with different devices. This embodiment enables the carrier to be placed upon an existing safety seat for an infant/toddler carrier adapting to a stroller or carriage insert, or any docking or adapting device that will accept the proprietary device of the manufacturer, any carrier but not limited to infant, toddler and child safety seats, boosters or any carrier that is appropriate for newborn infants to young adults depending on height restrictions found in existing methods of land, nautical or airborne vehicle transport and will protect the passenger or cargo that is placed on the 1 carrier from the shock forces by reducing the impact wave causing gradual deceleration, bringing the mass slowly to rest while reducing the crash force.

A similar design using extra visco elastic material for the shock absorbing cushion pad providing extra safety measures for the small cranium to shield the cervical and cranial areas from horizontal shock force transfer. FIG. 9 number 2, page 1 of 1, embodiment 3 shows the added extra shock absorbing circle for greater protection for the tiny cranium.

Other objects and advantages will be named or will become apparent from, the specifications and claims, as will modifications of the named embodiment shown in the drawings, in which:

FIG. 9 is a front right perspective embodiment view of the disclosed invention as a pad or cushion for a child safety seat; FIG. 10 is a right side see-thru sectional view of the disclosed invention as a complete cushion with a fixed layer of visco elastic materials built directly into the seat and including the shock absorbing harness covers used along with other safety features for greater protection; This specific embodiment of the disclosed invention is to be used as a carrier, a pad or cushion intended to upgrade existing seated transport for infant and children's safety seats and is designed to be a supplemental safety device to be used with other safety devices presently installed in vehicles and in children safety seats. The small passenger, cargo or goods intended for transport will utilize the carrier pad or cushion as a protective barrier to inhibit the strike force plane from injuring or causing damage to the tiny passengers or items placed upon the carrier. Allowances will be made to customize the carrier mat or cushion to allow for supplemental safety devices 2 such as the disclosed invention, the shock absorbing shoulder harnesses to operate at optimal capacity without compromise for the safety of each existing system that is currently in place.

FIG. 9 illustrates the disclosed invention in the embodiment of a shock absorbing mat, pad or cushion for an infant or child safety seat or "3-in-one" conversion seat and is shown in its front perspective lying flat in FIG. 9 having a front upper headrest 1 with at least one extra layer of visco elastic polymer possessing a soft, comfortable texture (perhaps using a differing durometer) for extra protection to the tiny cranium 2 and a central back member 3 with side wings for extra protection 4 the seat portion is a point where the lower side wings 4 meet with the seat portion 5 and the lower leg portions are positioned 6. The entire carrier can be made of a single sheet of visco elastic polymer when embodying the mat or pad 7.

This forms the front perspective layer of the cushion lying flat in FIG. 9. The disclosed invention can be covered with durable fabrics, more foam for greater positioning and comfort when embodying a shock absorbing cushion or it has a back portion which is the back of the visco elastic material in the embodiment of a pad or mat having a sturdy material that would be made of durable appropriate existing materials found in pads, or covers presently. In the manufacture of a shock absorbing carrier in the embodiment of a cushion (at least one layer of) the visco elastic material is sandwiched between padding material and fabric will envelope the entire cushion with the disclosed invention being placed on the side touching the small passenger on top of the padding or cushion.

FIG. 10 Illustrates a right side see-thru sectional view of the disclosed invention as a complete cushion with a fixed layer of visco elastic material built directly into the shell of the safety seat 8; having an upper back portion 9 (which can be reinforced with an additional layer(s) of visco elastic material offering extra protection to the tiny cranium), a lower back portion 10 a 3 seat portion 11 and a lower leg portion 12. The side wings 13 are attached to the upper back portion 9 a lower back portion 10 and the seat portion 11 and the lower leg portion 12 in a continuous connection 14 merging all parts with or without a fold or seam and can be continuous and comfortable 14 when embodying the shock absorbing infant safety seat.

FIG. 10 is illustrated here with the shock absorbing safety harness shown here installed with the shock absorbing baby safety seat as a supplemental safety device to be used with the existing safety technologies found in vehicles and children's transport carries at the present time. FIG. 10 shows the shoulder belts covered with another of the disclosed invention's embodiment, the harness cover 15 for the upper body is shown here as a supplemental safety device being used concurrently with the carrier as a shock absorbing safety seat, the right upper body harness is completely covered by the disclosed invention in the embodiment of a harness cover on the right shoulder strap 15 while the left shoulder harness covering is shown with a cut-a-way harness cover view 16 showing the buckle partially covered with the visco elastic material and the shoulder harness underneath revealed in a cut-a-way view of the left strap 17 with the lower hip restraint straps 18 also enveloped with the disclosed invention as the shock absorbing harness covers are in use with visco elastic material protection under the buckle/fastener of the infant safety seat for additional protection.

An added enjoyment is that not only will it be a protective safety device but the disclosed invention will improve the appearance of the interior seating, is waterproof, flame retardant and the top layer 18 depicted in FIG. 10 can be further embellished.

EMBODIMENT 4

Carrier and Shock Absorbing Harness

The main function of the disclosed invention is to provide a shock absorbing cover or harness as a supplemental safety device to be used with current safety systems protect the passenger, rider, occupant, etc. lessening and diminishing the shock forces that may stress or cause harm to the occupant.

The preferred embodiments of the disclosed invention as a shock absorbing seatbelt or cover, illustrating their features, will now be discussed in detail. These embodiments depict the novel and non-obvious shock absorbing seat belt or seatbelt or harness/strap cover shown in the accompanying drawings, which are for illustrative purposes only.

This and all the items can be customized to accommodate many special situations, different and unusual features that may arise, including but not limited to other objects and advantages will be pointed out or be apparent from, the specifications and claims, as will obvious modifications of the single embodiment shown in the drawings here, in which:

DETAILED DESCRIPTION OF EMBODIMENT 4

The preferred embodiment of the present seatbelt protector 1 is illustrated in FIG. 11 showing a tube or cylindrical cover or sheath surrounding or encircling the seatbelt or any other harness or strap. The covers are composed of an upper shoulder covering 2 and a lower lap belt 8 covering 3 which is slid over the seated passenger's lap or hips and is adjusted comfortably to fit each individual and offer shock absorbing protection to the occupant or cargo. The same placement and comfort that is presently found in vehicles with the existing 3 point safety harness or belts but this is a utilitarian supplemental safety device to be used with the existing safety systems found in vehicles on the market today.

In FIG. 11 either section 2 or 3 of the cover comprises a set length of rectangular fabric encasing a visco elastic polymer in the side worn next to the body of the seated passenger. FIG. 12 Showing the first upper surface 4 of the protector between the front or first side 4 and second edge or the back 5 having the layer of visco elastic polymer that will be placed upon the inside of the fabric that will directly touch the passengers body 5, include an edge having fasteners 6 that will cause the rectangle to tri-fold into a cylindrical tube which will encase the safety belt. Those having common sense or skill in the art will appreciate that the fasteners secure the edges joining the opposite edges to form a tube that has the shock absorbing visco elastic material fixed into the cover 6 in such a way to wrap around enclosing the seat belt or any strap quickly and easily being installed.

The cover in FIG. 13 is shown in a cross sectional side view perspective. It can be constructed of any durable material to cover one side of upper outside 7 that can be decorated or embellished with a logo, color or fabric, the visco elastic polymer can be manufactured so that it is waterproof, antibacterial and fire retardant and durable. This sleeve or tube is placed over the seatbelt 8 and attached with a fastener such as Velcro at the edges 10 with the visco elastic polymer 9 placed directly on the opposite edge of the durable cover that comes into contact with the wearer's body.

In FIG. 14, the disclosed invention as a shock absorbing harness/belt cover has areas that fasten 11 and 12 and with a Velcro method with the short end edges 13 and 14 from which the belt will extend outwards 15 when in use as shown in FIGS. 11 and 16 as shown in FIG. 12. The disclosed invention is appropriate for use with any safety harness, airline belts, thrill craft or any device that has the form or function of a harness, strap or belt which would benefit from shock absorbing properties.

EMBODIMENT 5

Carrier and Shock Absorber for Patient Transport

It is, therefore, an object of the disclosed invention to provide a fixed or removable mat, cushion or pad of varying layers and durometers for shock absorbing properties depending upon the conditions and demands that the carrier would have to endure; it is recommended that for rescue devices that a customized model be designed for maximum efficiency which would offer greater comfort and lessen stress but not interfere with any function of the device during transport to carry and hold the injured party directly upon the disclosed invention, steady but securely during extraction transport having shock absorbing means as an integral part of the disclosed invention.

DETAILED DESCRIPTION OF EMBODIMENT 5

FIG. 15 illustrates a preferred embodiment of the disclosed invention in the form of a pad or a protective liner for a rescue basket, stretcher, litter, gurney or other rescue carrier. This embodiment enables the carrier to be placed upon an existing rescue transport carrier device or any carrier that is appropriate for carrying anyone or anything that is injured.

FIG. 15 Illustrates the disclosed invention in the embodiment of a shock absorbing visco elastic polymer mat, pad or cushion for emergency transport possessing a soft, comfortable texture of a specific durometer is shown installed and positioned in its front perspective 2, lying flat in a basic plastic basket stretcher 1. The molded-in runners and handholds 3 are still easily accessible and not impeded in any way. The quick release patient restraints 4 are easy to use and assess and permit the responders to easily adjust the straps to fit the patient.

FIG. 16 is showing the carrier uninstalled 5 having at least one layer of visco elastic polymer possessing a soft, comfortable texture. The entire carrier can be made of a single sheet of visco elastic polymer when embodying the mat or pad 6. The disclosed invention can be covered with durable fabrics, made to have great fire resistant properties, be manufactured to have antibacterial properties or topped with more foam for greater positioning and comfort when embodying a shock absorbing carrier pad or mat The top portion which is the part of the visco elastic polymer that the injured patient will be placed lying down on the disclosed invention in the embodiment of a pad or mat on a rescue stretcher depending on restrictions found in existing methods of land, nautical or airborne vehicle transport.

The invention claimed is:
1. A carrier comprising: a base;
a seat fixed to a lower portion of the base, wherein the seat defines a sitting or holding area;
a force absorption carrier pad detachably positioned on the seat, wherein the fore absorption carrier pad comprises:
an outer fabric cover, a pad; and
one or more shock absorbing mats or layers, positioned between the outer fabric cover and the pad;
wherein the outer fabric cover wraps around a cushion positioned on the seat such that an inner surface of the outer fabric cover contacts the cushion; the force absorption carrier pad including the one or more shock absorbing mats or layers, has a hole defined therein such that buckles extending from the base and attached to the seat cushion protrude through the hole for access by a user.

* * * * *